(12) United States Patent
Marquardt

(10) Patent No.: US 10,308,261 B2
(45) Date of Patent: Jun. 4, 2019

(54) ROLLING-ELEMENT BEARING UNIT

(71) Applicant: SCHAEFFLER TECHNOLOGIES AG & CO. KG, Herzogenaurach (DE)

(72) Inventor: Christoph Marquardt, Bergrheinfeld (DE)

(73) Assignee: SCHAEFFLER TECHNOLOGIES AG & CO. KG, Herogenaurach (DE)

( * ) Notice: Subject to any disclaimer, the term of this patent is extended or adjusted under 35 U.S.C. 154(b) by 0 days.

(21) Appl. No.: 15/740,221

(22) PCT Filed: Apr. 26, 2016

(86) PCT No.: PCT/DE2016/200197
§ 371 (c)(1),
(2) Date: Dec. 27, 2017

(87) PCT Pub. No.: WO2017/000937
PCT Pub. Date: Jan. 5, 2017

(65) Prior Publication Data
US 2018/0312177 A1 Nov. 1, 2018

(30) Foreign Application Priority Data
Jun. 29, 2015 (DE) .................. 10 2015 212 067

(51) Int. Cl.
*B61F 15/22* (2006.01)
*F16C 33/76* (2006.01)
(Continued)

(52) U.S. Cl.
CPC .............. *B61F 15/22* (2013.01); *B61F 15/12* (2013.01); *F16C 33/768* (2013.01);
(Continued)

(58) Field of Classification Search
CPC .... F16C 2326/10; F16C 35/07; F16C 35/073; F16C 41/04; F16C 2226/70;
(Continued)

(56) References Cited

U.S. PATENT DOCUMENTS 1,908,474 A * 5/1933 Dewees .................. F16C 19/54
384/501
4,692,040 A * 9/1987 Ebaugh ................... B21B 31/07
277/551

(Continued)

FOREIGN PATENT DOCUMENTS

CH          360551 A    2/1962
DE       4222852 A1    1/1994
(Continued)

OTHER PUBLICATIONS

Machine translation of JP 2004-360723 dated Dec. 2004 (Year: 2004).*

(Continued)

*Primary Examiner* — Alan B Waits
(74) *Attorney, Agent, or Firm* — Brooks Kushman P.C.

(57) ABSTRACT

A roller bearing unit for rail vehicles, having an inner bearing ring, an outer bearing ring, rolling elements arranged between the bearing rings, and at least one retainer element. The inner bearing ring and the retainer element are configured to be arranged on an axle. The retainer element is arranged radially between an axial end of the inner bearing ring and the axle, and radially between a contact part lying against the end face of the inner bearing ring, and the axle. The retainer element has at least one sealing element sealing the inner bearing ring.

20 Claims, 3 Drawing Sheets

(51) Int. Cl.
*F16C 35/06* (2006.01)
*F16C 19/38* (2006.01)
*F16C 35/063* (2006.01)
*B61F 15/12* (2006.01)

(52) U.S. Cl.
CPC .......... *F16C 35/063* (2013.01); *F16C 19/386* (2013.01); *F16C 2326/10* (2013.01); *F16C 2361/31* (2013.01)

(58) Field of Classification Search
CPC .. F16C 2226/74; F16C 33/768; F16C 19/386; F16C 2361/31; B61F 15/12; B61F 15/22
See application file for complete search history.

(56) References Cited

U.S. PATENT DOCUMENTS

| | | | | |
|---|---|---|---|---|
| 5,058,262 A * | 10/1991 | Brockmuller | .......... | B21K 25/00 29/725 |
| 5,462,367 A * | 10/1995 | Davidson | ................ | B61F 15/12 384/459 |
| 5,492,419 A * | 2/1996 | Miller | .................. | F16C 19/386 384/551 |
| 5,651,617 A * | 7/1997 | Danielsson | .......... | B60B 27/001 384/539 |
| 6,203,206 B1 * | 3/2001 | Dagh | ..................... | F16C 33/60 384/477 |
| 6,371,033 B1 * | 4/2002 | Smith | ..................... | B61F 3/08 105/157.1 |
| 7,121,728 B2 * | 10/2006 | Pete | ..................... | F16C 19/386 384/477 |
| 7,219,938 B2 | 5/2007 | Brister et al. | | |
| 2003/0094849 A1 * | 5/2003 | Joki | ..................... | B60B 27/001 301/105.1 |
| 2009/0123099 A1 * | 5/2009 | Dickerhoff | ............. | B61F 15/22 384/459 |

FOREIGN PATENT DOCUMENTS

| | | | | |
|---|---|---|---|---|
| DE | 102006045487 A1 | | 4/2008 | |
| EP | 1600349 A1 | | 11/2005 | |
| JP | H11321211 A | | 11/1999 | |
| JP | 2003028170 A | * | 1/2003 | ............ F16C 19/386 |
| JP | 2004360723 A | * | 12/2004 | ............ F16C 19/184 |
| WO | 0238428 A1 | | 5/2002 | |
| WO | 03095856 A1 | | 11/2003 | |
| WO | 2006094031 A1 | | 9/2006 | |

OTHER PUBLICATIONS

International Search Report for International Application No. PCT/DE2016/200197 dated Jul. 21, 2016.

\* cited by examiner

ROLLING-ELEMENT BEARING UNIT

CROSS-REFERENCE TO RELATED APPLICATIONS

This application is the U.S. National Phase of PCT/DE2016/200197 filed Apr. 26, 2016, which claims priority to DE 102015212067.8 filed Jun. 29, 2015, the entire disclosures of which are incorporated by reference herein.

TECHNICAL FIELD

This disclosure relates to a roller bearing unit for rail vehicles.

BACKGROUND

A roller bearing unit for rail vehicles comprises a roller bearing with an inner bearing ring, an outer bearing ring, and roller elements arranged between them, wherein the roller bearing is attached on one end of an axle. On the end face of the axle an end cap is arranged, which completely encloses the end face of the axle. The end cap contacts the end face of the inner bearing ring of the roller bearing. A support ring is also arranged to be in direct contact on the other end face of the inner bearing ring.

However, in operation the axle exhibits high rotational fatigue, so that a gap is produced that closes and again opens with every rotation, between the inner bearing ring and support ring, as well as between the inner bearing ring and end cap. Liquids such as rain, sprayed water, oils and the like penetrate through this gap into the space between the roller bearing and the axle. The liquids accumulating there can lead to axle corrosion.

WO 2006/094031 discloses a roller bearing unit with a retaining clip. The roller bearing unit is mounted on the axle. The retaining clip connects the support ring with the inner bearing ring before and during assembly, and after assembly creates a liquid barrier. The liquid barrier is created in that the retaining clip has an annular rib on both of its ends, which points radially outward.

The object of the present disclosure, accordingly, is to further develop the roller bearing unit vis-à-vis the prior art and to improve it.

SUMMARY

To attain the invention-specific object, the roller bearing unit indicated in the claims is proposed.

In one embodiment, a roller bearing unit comprises an inner bearing ring, an outer bearing ring, roller elements arranged between the bearing rings and at least one retaining element, wherein the inner bearing ring and the retaining element are arranged on an axle and the retaining element is arranged radially between an axial end of the inner bearing ring and the axle and radially between a contact part contacting the end face of the inner bearing ring and the axle. The roller bearing unit is characterized in that, on the retaining element, at least one sealing element is attached. The sealing element can be configured as a band and have an annular form. Instead of a single encircling sealing element, use of multiple sectional annular sealing elements is conceivable. The sealing element may be furthermore arranged on the radial outer side of the retaining element. The sealing element prevents liquids, for example, from penetrating into the space between the axle and inner bearing ring. The inner bearing ring can be designed as a single piece or with multiple pieces.

The retaining element may be annular in design and on both ends has a snap-on contour. This means that projections, for example snap-on lugs, are arranged on the outer diameter at both axial ends of the retaining element. With this the snap-on lugs are designed to be segmented in the revolving direction. Additionally, it is advantageous if the snap-on lugs are arranged to be offset at both ends in the revolving direction. It is appropriate if the distance between two snap-on lugs in the revolving direction is as great as the length of the snap-on lugs in the circumferential direction itself.

In addition it is advantageous if the inner bearing ring has a contour that corresponds to that of the retaining element. Through the snap-on contour of the retaining element and the contour that corresponds thereto on the inner diameter of the inner bearing ring, it is simpler to assemble the roller bearing unit on the axle.

Additionally, the contact part has a contour that corresponds to the snap-on contour of the retaining element. What is understood by contact part is any element that directly contacts an end face of the inner bearing ring. The contact part can for example be designed as a contact ring, often also called a support ring, or as an end cap.

Through the snap-on contours, the inner bearing ring is connected with a contact part. This means that the retaining element has purely a retaining function. In contrast, the sealing element arranged on the retaining element has a sealing function. Although space is limited in roller bearing units, both functional elements can be incorporated.

Additionally it is advantageous if two retaining elements are arranged on the axle. With this, one retaining element is arranged on each axial end of the inner bearing ring. This means that each of the two retaining elements connects the inner bearing ring with a contact part and the sealing elements attached to the retaining elements seal the space between the inner bearing ring and the axle.

The retaining element and the sealing element may consist of different materials. The retaining element for example consists of plastic, for example PA66GF25. In contrast, the sealing element consists of natural rubber for example.

In addition, the roller elements may be arranged in two rows. Preferably this is a dual-row conical roller bearing in an O-arrangement. But also, for example, cylindrical roller bearings or spherical roller bearings can be used. The roller bearing can be arranged on the axle by means of a pressed connection. The axle can be designed as a solid or a hollow shaft.

BRIEF DESCRIPTION OF THE DRAWINGS

Further particulars, features, combinations of features and effects based on the invention are derived from the following specification of preferred, exemplary embodiments of the invention and from the drawings. Shown in these are.

DETAILED DESCRIPTION OF THE DRAWINGS

Figure 1:
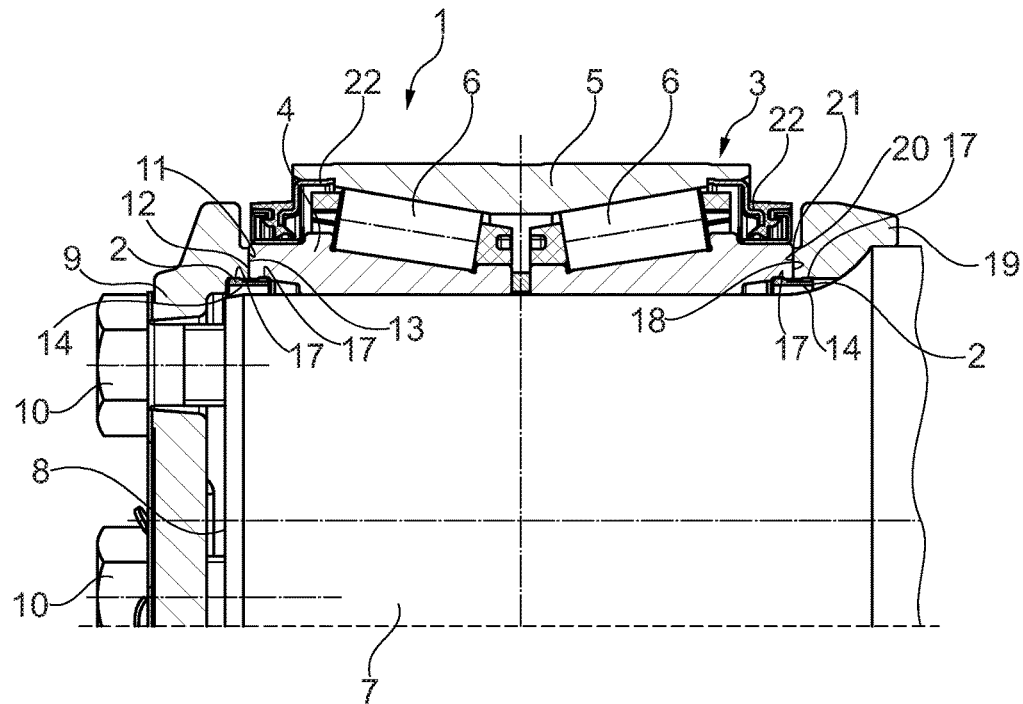
FIG. 1 is an exemplary embodiment of a roller bearing unit with two retaining elements in a sectional view.
Figure 2:
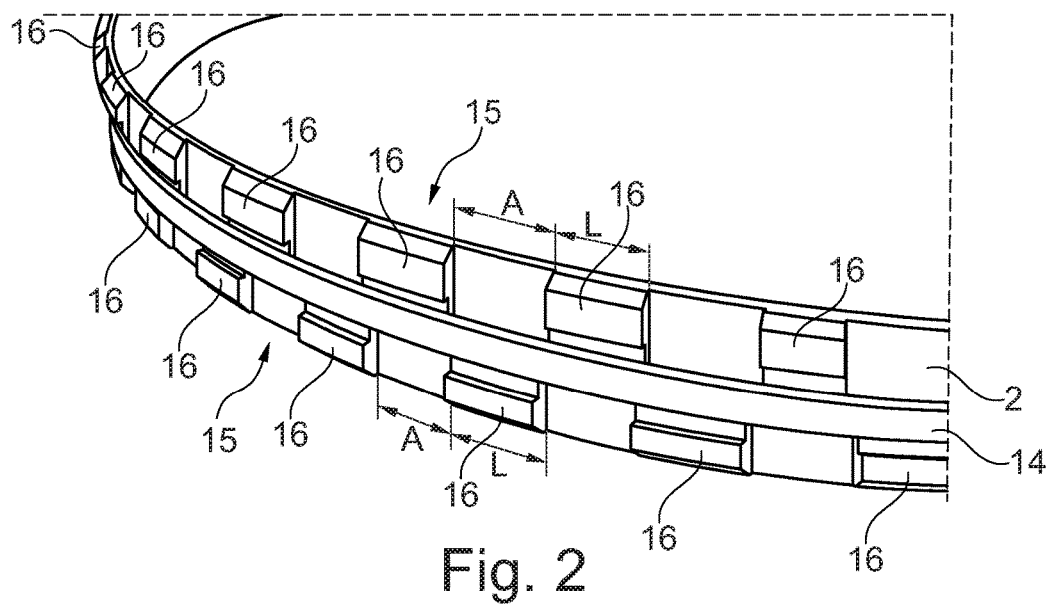
FIG. 2 is an exemplary embodiment of a retaining element with a sealing element.

FIG. 1 shows an exemplary embodiment of a roller bearing unit 1 with two retaining elements 2 in a sectional view. The roller bearing unit 1 depicted comprises a roller bearing 3 and two retaining elements 2. Roller bearing 3 has a multi-part inner bearing ring 4, a single-piece outer bearing ring 5 and, radially between the two bearing rings 4, 5, a plurality of roller elements 6 in two rows. The roller bearing 3 is designed in this embodiment as a dual-row tapered roller bearing in an O arrangement.

The multi-part inner bearing ring 4 is compressed on one end of an axle 7, with the axle 7 being designed as a solid axle. The end face 8 of axle 7 is completely enclosed by an end cap 9. End cap 9 is connected so as not to turn with axle 7 by means of multiple, axially running attachment elements 10, in this design by screws. The end face 11 of end cap 8, pointing in the direction of roller bearing unit 1, contacts the end face 12 of inner bearing ring 4, so that both end faces 11, 12 form a contact surface 13. Radially between contact surface 13 and axle 7, a retaining element 2 is arranged with a sealing element 14. Retaining element 2 is directed axially toward contact surface 13.

Figure 3:
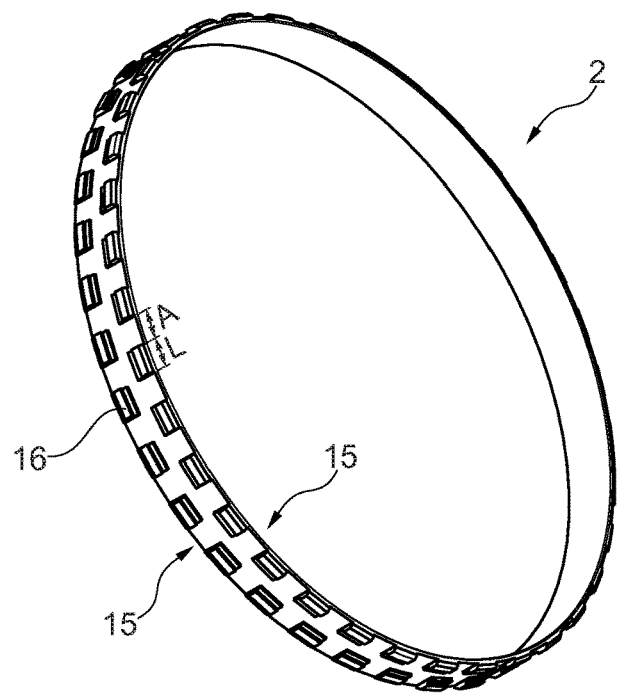
FIG. 3 is the retaining element of FIG. 2 without the sealing element.
Figure 4:
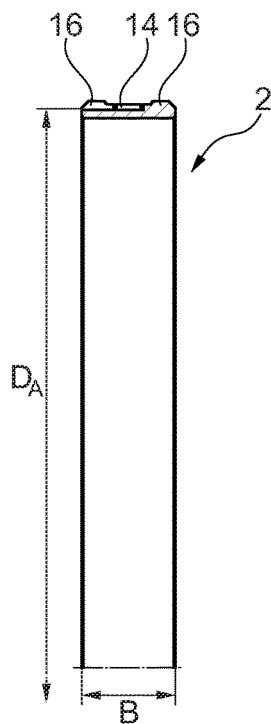
FIG. 4 is the retaining element of FIG. 2 in a sectional view.
Figure 5:
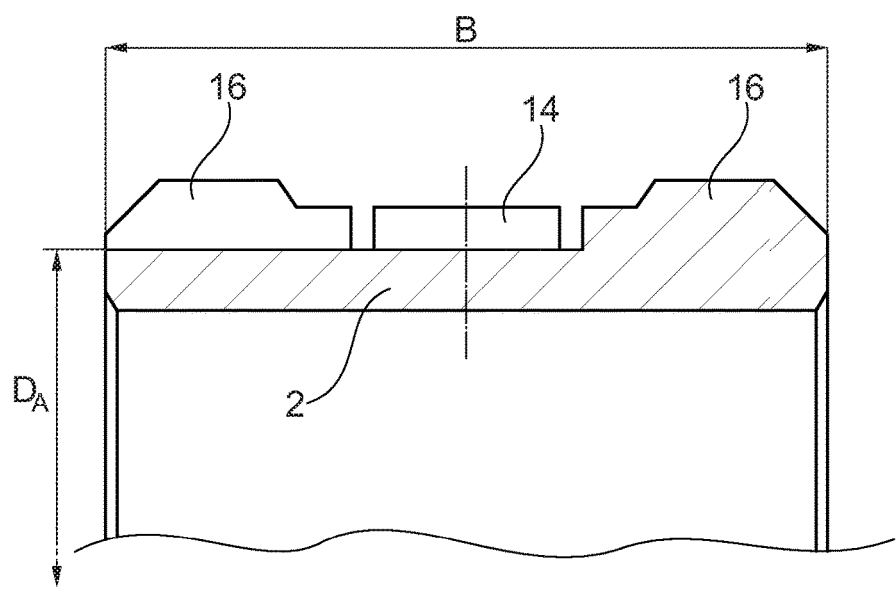
FIG. 5 is an enlarged view of a snap-on contour of the retaining element with a sealing element.

FIGS. 2 to 5 show an exemplary embodiment of a retaining element 2 in various views, wherein in FIG. 3, retaining element 2 is designed without sealing element 14. Retaining element 2 has an annular design and has a snap-on contour 15 at both axial ends. Snap-on contour 15 consists of a plurality of projections 16, with the projections 16 extending out in a radial direction from the outer diameter $D_A$ of retaining element 2. In addition, the projections 16 extend in the axial direction over a third of the width B of retaining element 2. Snap-on contour 15 accordingly is segmented at both ends. The distance A in the circumferential direction between two projections 16 arranged next to each other is always equal and corresponds to length L of a projection 16 in the circumferential direction. Snap-on contours 15 at both axial ends of retaining element 2 are displaced from each other by length L in the circumferential direction. Axially central on the outer diameter $D_A$, that is, on the radial outer side, of retaining element 2, a sealing element 14 is arranged in the circumferential direction. Sealing element 14 is configured as an annular band, which has less extension in the radial direction as compared to the projections 16. This means that sealing element 14 does not contact axle 7 and the sealing surface is directed outward.

The inner bearing ring 4 and end cap 9 at the particular inner diameter have a contour corresponding to the snap-on contour 15 of retaining element 2. The contour is configured as a circumferential groove 17, into which the projections 16 of retaining element 2 snap or engage. Retaining element 14 prevents penetration of liquids through a possibly present gap on contact surface 13.

On the other end face 18 of inner bearing ring 4, a support ring 19 is arranged, the end face 20 of which directly contacts end face 18 of inner bearing ring 4, so that a contact surface 21 likewise results. Here also, radially between axle 7 and contact surface 21 a retaining element 2 and a sealing element 14 are arranged, that is centrally directed to contact surface 21. For this also on the inner diameter of inner bearing ring 4 and on the inner diameter of support ring 19, a circumferential groove 17 is provided, which has a contour which corresponds to the particular snap-on contour 15 of retaining element 2. Sealing elements 14 of the particular retaining element 2 prevent penetration of liquids into the space between inner bearing ring 4 and axle 7 through contact surfaces 13, 21.

Roller bearing 3 is additionally sealed by two seals 22 toward a bearing housing that is not depicted.

LIST OF REFERENCE SYMBOLS 1 roller bearing unit
2 retaining element
3 roller bearing
4 inner bearing ring
5 outer bearing ring
6 roller element
7 axle
8 end face of axle
9 end cap
10 attachment element
11 end face of end cap
12 first end face of inner bearing ring
13 contact surface between inner bearing ring and end cap
14 sealing element
15 snap-on contour
16 projection
17 circumferential groove
18 second end face of inner bearing ring
19 support ring
20 end face of support ring
21 contact surface between inner bearing ring and support ring
22 bearing seal
A distance between projections in circumferential direction
B width of retaining element in the axial direction
$D_A$ outer diameter of the retaining element
L length of projection in the circumferential direction

The invention claimed is:

1. A roller bearing unit for rail vehicles, comprising an inner bearing ring, an outer bearing ring, bearing elements arranged between the bearing rings and a retaining element, wherein the inner bearing ring and the retaining element are arranged on an axle and the retaining element is arranged radially between an axial end of the inner bearing ring and the axle and radially between a contact part axially outboard from the inner bearing ring and contacting an end face of the inner bearing ring and the axle, wherein a sealing element is attached to the retaining element.

2. The roller bearing unit of claim 1, wherein the sealing element is configured as a band and has an annular shape.

3. The roller bearing unit of claim 1, wherein the retaining element on both ends has a snap-on contour and the inner bearing ring has a contour corresponding thereto.

4. The roller bearing unit of claim 3, wherein the contact part has a contour corresponding to the snap-on contour of the retaining element.

5. The roller bearing unit of claim 1, wherein the contact part is configured as a contact ring.

6. The roller bearing unit of claim 1, wherein the contact part is configured as an end cap.

7. The roller bearing unit of claim 1, wherein the bearing elements are arranged in two rows.

8. The roller bearing unit of claim 1, wherein the retaining element consists of plastic.

9. The roller bearing unit of claim 1, wherein the sealing element consists of natural rubber.

10. The roller bearing unit of claim 1, wherein the sealing element is arranged on the radially outer side of the retaining element.

11. A roller bearing unit comprising:
an inner bearing ring disposed about an axis, including an axial end and configured to be arranged on a rotatable axle;
an outer bearing ring about the axis and radially outboard from the inner bearing ring;
a plurality of roller elements radially between the inner bearing ring and the outer bearing ring;
a contact part axially outboard from the inner bearing ring and having an end face contacting the axial end of the inner bearing ring at an interface; and
a retaining element radially inward from and radially aligned with the interface, the retaining element having an outer surface contacting both the inner ring and the contact part, the outer surface having a sealing element sealing the interface and configured to inhibit liquid from passing radially inward of the interface.

12. The roller bearing unit of claim 11, wherein the retaining element has a plurality of projections extending radially outward from the outer surface.

13. The roller bearing unit of claim 11, wherein the retaining element has a first set of projections extending circumferentially about the outer surface, and a second set of projections extending circumferentially about the outer surface.

14. The roller bearing unit of claim 13, wherein the first and second sets of projections are axially spaced from one another, and the sealing element is located between the first and second sets.

15. The roller bearing of claim 13, wherein the first and second sets of projections are offset from one another such that one of the projections of the first set of projections axially aligns with a gap between two of the projections of the second set of projections.

16. The roller bearing of claim 11, wherein the contact part is an end cap axially covering the inner bearing ring and configured to axially cover a portion of the axle.

17. The roller bearing of claim 11, wherein the contact part is a contact ring.

18. The roller bearing of claim 11, wherein the roller elements may include conical roller elements, cylindrical roller elements, or spherical roller elements.

19. A roller bearing comprising:
an inner bearing ring disposed about an axis and having an axial end;
an outer bearing ring disposed about the axis;
a plurality of roller elements radially between the inner bearing ring and the outer bearing ring;
a contact element axially outboard from the inner bearing ring and contacting the axial end of the inner bearing ring at a contact interface; and
a retaining element radially inward from and radially aligned with the axial end of the inner bearing, the retaining element having a plurality of projections fitted into a corresponding plurality of contours on an inner surface of the inner bearing to connect the retaining element to the inner bearing, the retaining element further including a seal sealing an inner portion of the axial end at the contact interface to inhibit liquid from passing radially inward of the axial end.

20. The roller bearing of claim 19, wherein the roller elements include conical roller elements, cylindrical roller elements, or spherical roller elements.

* * * * *